US012590614B2

(12) United States Patent
Zenzen

(10) Patent No.: US 12,590,614 B2
(45) Date of Patent: Mar. 31, 2026

(54) FLOATING CALIPER BRAKE HAVING TWO METAL SECTIONS AND ONE ELASTOMER SECTION

(71) Applicant: ZF Active Safety GmbH, Koblenz (DE)

(72) Inventor: Guido Zenzen, Macken (DE)

(73) Assignee: ZF Active Safety GmbH, Koblenz (DE)

( * ) Notice: Subject to any disclaimer, the term of this patent is extended or adjusted under 35 U.S.C. 154(b) by 435 days.

(21) Appl. No.: 18/363,146

(22) Filed: Aug. 1, 2023

(65) Prior Publication Data

US 2024/0044379 A1 Feb. 8, 2024

(30) Foreign Application Priority Data

Aug. 5, 2022 (DE) .......................... 102022208161.7

(51) Int. Cl.
*F16D 55/226* (2006.01)
*F16D 65/095* (2006.01)
*F16D 55/00* (2006.01)

(52) U.S. Cl.
CPC ......... *F16D 65/095* (2013.01); *F16D 55/226* (2013.01); *F16D 2055/0008* (2013.01)

(58) Field of Classification Search
CPC .... F16D 65/095; F16D 55/226; F16D 55/227; F16D 55/2265; F16D 2055/0008
USPC ........... 188/73.44, 73.45; 277/634–642, 648
See application file for complete search history.

(56) References Cited

U.S. PATENT DOCUMENTS

| | | | | |
|---|---|---|---|---|
| 4,222,463 A | | 9/1980 | Domes et al. | |
| 4,469,337 A | * | 9/1984 | Yokoi | F16D 55/22655 |
| | | | | 188/73.31 |
| 4,530,506 A | * | 7/1985 | Weiler | F16D 55/22655 |
| | | | | 188/73.31 |
| 4,678,064 A | * | 7/1987 | Adachi | F16D 55/227 |
| | | | | 277/648 |

(Continued)

FOREIGN PATENT DOCUMENTS

JP 2007231984 A 9/2007

*Primary Examiner* — Christopher P Schwartz
(74) *Attorney, Agent, or Firm* — Kristin L. Murphy

(57) ABSTRACT

A floating caliper brake is shown including a first metal section fastened non-positively to a guiding element and is-arranged in a recess so that, in a first position, a first section of the first metal section rests in an axial direction, with positive engagement, against a first section of a wall, which defines the recess, on a first side of a limiting element, wherein, in a second position, in which the first metal section and the first section of the wall are arranged at a distance from one another in the axial direction, a first elastomer section is deformed elastically such that a spring force acts on the first metal section-in an axial direction and towards the first section of the wall, and wherein, when the spring force is equal to or greater than a predetermined non-positive engagement force threshold, the non-positive connection between the first metal section and the guiding element is cancelled, resulting in that the first metal section moves relative to the guiding element in the axial direction, and when the spring force is less than the predetermined non-positive engagement force threshold, the non-positive connection between the first metal section and the guiding element is re-established.

14 Claims, 2 Drawing Sheets

(56)         References Cited

U.S. PATENT DOCUMENTS

| 4,685,686 | A | * | 8/1987 | Weiler | .................... | F16J 15/52 |
| | | | | | | 403/50 |
| 4,754,854 | A | * | 7/1988 | Adachi | ............ | F16D 55/22655 |
| | | | | | | 137/154 |
| 4,887,696 | A | | 12/1989 | Redenbarger et al. | | |
| 4,926,979 | A | * | 5/1990 | Odaka | .................. | F16D 55/227 |
| | | | | | | 188/73.44 |
| 2023/0136921 | A1 | * | 5/2023 | Madzgalla | ........ | F16D 55/22655 |
| | | | | | | 188/73.44 |

* cited by examiner

FLOATING CALIPER BRAKE HAVING TWO METAL SECTIONS AND ONE ELASTOMER SECTION

CROSS-REFERENCE TO RELATED APPLICATION

This application claims priority to German Priority Application No. 1020222081617, filed Aug. 5, 2022, the disclosure of which is incorporated herein by reference in its entirety.

TECHNICAL FIELD

The present disclosure relates to a floating caliper brake.

BACKGROUND

Floating caliper brakes are known from the prior art. These floating caliper brakes usually have a brake carrier, which has a fastening arrangement for fastening the brake carrier to a component of a vehicle, a brake caliper, which has a fastening arrangement for fastening an actuating device to the brake caliper, and a guiding device, which is designed to guide the brake caliper relative to the brake carrier in an axial direction.

The brake caliper usually has connected to it, brake pads, which can be brought into contact with a brake disc by an actuating device. When the brake pads are brought into contact with the brake disc, this can slow down a rotational movement of the brake disc about an axis of rotation, which runs parallel to an axial direction. Bringing the brake pads into contact with the brake disc can also be referred to as a braking process. During a braking process, braking forces act between the brake disc and the brake pads. Particularly the braking forces acting perpendicularly to the axial direction, or at least a large part of these braking forces, are usually transmitted directly to the brake carrier via carrier plates, to which the brake pads are fastened, via contact surfaces, at which the carrier plates rest against the brake carrier. In the brake caliper, in turn, forces act primarily in the axial direction. The weight of the brake caliper, the weight of an actuating device, vibrations which are caused, for example, by the braking process, deformation forces or even a small proportion of the forces caused by the braking process which act perpendicularly to the axial direction can be transmitted to the component of the vehicle via the brake caliper and the brake carrier.

In general, it is desirable with floating caliper brakes, particularly in the event of wear phenomena on the brake pads or the brake disc, that a delay-free braking process is ensured and that, when no braking process is being carried out, the brake pads are arranged at a sufficient distance from the corresponding surfaces of the brake disc.

SUMMARY

What is needed is a floating caliper brake in which, for example, in the event of wear phenomena on the brake pads or the brake disc, a delay-free braking process is ensured, and, when no braking process is being carried out, sufficient distances between the brake pads and the corresponding surfaces of the brake disc are ensured.

According to a first aspect of the disclosure, a floating caliper brake is disclosed. The floating caliper brake may be a fist-type caliper brake. A fist-type caliper brake has the advantage that the brake caliper can be dimensioned in a material-saving manner. For example, in contrast to a floating frame brake, the fist-type caliper brake has the advantage that no floating frame and no floating frame guide have to be provided. The floating caliper brake has a brake carrier, a brake caliper and a guiding device. The brake carrier has a fastening arrangement for fastening the brake carrier to a component of a vehicle. The brake caliper has a fastening arrangement for fastening an actuating device to the brake caliper. The guiding device is designed to guide the brake caliper relative to the brake carrier in an axial direction. The guiding device has a guiding element, which extends from a fastening region, by which the guiding element is fastened to a section of the brake caliper, towards a free end, and a bore section, which extends in an axial direction, in a section of the brake carrier. A section of the guiding element is arranged in the bore section. Moreover, the floating caliper brake has a limiting device, which is designed to limit the movement of the brake caliper relative to the brake carrier in the axial direction, and which has a recess, connected to the bore section perpendicularly to the axial direction, in the section of the brake carrier, and a limiting element. The limiting element has a first metal section, a second metal section, which is connected to the section of the brake carrier, and an elastically deformable first elastomer section, which is connected to the first metal section on a first side of the first elastomer section and is connected to the second metal section on a second side of the first elastomer section situated opposite the first side. The first metal section is fastened non-positively to the guiding element and is arranged in the recess in such a way that, in a first position, a first section of the first metal section rests in the axial direction, with positive engagement, against a first section of a wall, which defines the recess, on a first side of the limiting element. In a second position, in which the first metal section and the first section of the wall are arranged at a distance from one another in the axial direction, the first elastomer section is deformed elastically in such a way that a spring force acts on the first metal section in the axial direction and towards the first section of the wall. When the spring force is equal to or greater than a predetermined non-positive engagement force threshold, the non-positive connection between the first metal section and the guiding element is cancelled, with the result that the first metal section moves relative to the guiding element in the axial direction. When the spring force is less than the predetermined non-positive engagement force threshold, the non-positive connection between the first metal section and the guiding element is re-established.

As already described, the brake carrier has the fastening arrangement for fastening the brake carrier to the component of the vehicle. The component is, for example, a wheel carrier of the vehicle. The fastening arrangement of the brake carrier ensures that forces which are caused by a braking process can be transmitted from the brake carrier to the component of the vehicle.

As likewise already described, the brake caliper has the fastening arrangement for fastening the actuating device to the brake caliper. In one exemplary arrangement, the actuating device has an electromechanical drive unit, which has a first section, which is connected to the fastening arrangement of the brake caliper, and has a second section, which is mounted so as to be movable with respect to the first section.

Alternatively, the actuating device has a hydraulic drive unit, which has a first section, which is connected to the fastening arrangement of the brake caliper, and has a second section, which is mounted so as to be movable with respect to the first section. Furthermore, the drive unit is designed to drive a relative movement between the first section and the second section. The brake caliper is connected to a first brake pad, and the second section of the drive unit is connected to a second brake pad. In this case, a first carrier plate, to which the first brake pad is attached, can be attached to the brake caliper, and a second carrier plate, to which the second brake pad is attached, can be attached to the second section of the drive unit. In the mounted state, the first brake pad is arranged on a first side of a brake disc and the second brake pad is arranged on a second side of the brake disc in such a way that the first brake pad, the brake disc and the second brake pad are arranged in series in the axial direction. In the mounted state of the brake disc, for example by movement of the first section and the second section relative to one another in the axial direction, the first brake pad can be moved in the direction of a first side of the brake disc and brought into contact with the brake disc, and the second brake pad can be moved in the direction of a second side of the brake disc and brought into contact with the brake disc. The actuating device is configured to move the first brake pad in the direction of and against a surface on the first side of the brake disc and to move the second brake pad in the direction of and against a surface on the second side of the brake disc.

The guiding device has the guiding element, which extends from the fastening region, by which the guiding element is fastened to the section of the brake caliper, towards the free end, and the bore section, which extends in an axial direction, in the section of the brake carrier. The fastening region is connected to the section of the brake caliper in such a way that a movement of the fastening region and of the section of the brake caliper in the axial direction with respect to one another is prevented. This ensures that a translation of the guiding element in the axial direction relative to the brake caliper is prevented. The fact that the bore section extends in the axial direction in the section of the brake carrier ensures that the bore section can be used to guide the brake caliper relative to the brake carrier in the axial direction. For fastening to the brake caliper, the fastening region of the guiding element has an internal thread, which extends along a central axis of the guiding element and into which an external thread of a screw engages. The combination of an internal thread and a screw with an external thread provides a simple and reliable detachable connection between the fastening region of the guiding element and the brake caliper.

The section of the guiding element is arranged in the bore section. The section of the guiding element which is arranged in the bore section is arranged between the fastening region and the free end. The section of the guiding element is arranged in the bore section in such a way that forces can be transmitted between the guiding element and the section of the brake carrier perpendicularly to the axial direction and, at the same time, a relative movement between the guiding element and the section of the brake carrier in the axial direction is ensured. Via the fastening region of the guiding element, forces which are caused by the weight of the brake caliper, by the weight of an actuating device, vibrations, deformation forces or else by a braking process can be transmitted from the brake caliper to the guiding element and from the latter, via contact between the section of the guiding element and an inner surface of the bore section, to the brake carrier, for example perpendicularly to the axial direction, and from there to the component of the vehicle.

Moreover, the floating caliper brake has a limiting device, which is designed to limit the movement of the brake caliper relative to the brake carrier in the axial direction, and which has a recess, connected to the bore section perpendicularly to the axial direction, in the section of the brake carrier, and a limiting element. The movement of the brake caliper relative to the brake carrier can be limited in the axial direction by virtue of the fact, for example, that, in the first position, the first section of the first metal section rests in the axial direction, with positive engagement, against the first section of the wall, which defines the recess, on the first side of the limiting element. In addition, the movement of the brake caliper relative to the brake carrier can be limited in the axial direction by virtue of the fact, for example, that the spring force acts on the first metal section in the axial direction and towards the first section of the wall and thus acts on the guiding element and the brake caliper. As already described, the recess is defined by the wall which has the first section. The wall can have a second section, which has a surface that runs around the central axis of the guiding element and which faces radially inwards relative to the central axis of the guiding element. The recess can be a blind hole which widens the bore section radially outwards relative to the central axis of the guiding element.

The limiting element has a first metal section, a second metal section, which is connected to the section of the brake carrier, and an elastically deformable first elastomer section, which is connected to the first metal section on a first side of the first elastomer section and is connected to the second metal section on a second side of the first elastomer section situated opposite the first side. The first metal section extends around the central axis and is arranged coaxially therewith, and the limiting element thereby ensures precise positioning of the guiding element relative to the brake carrier. The second metal section extends around the central axis and is arranged coaxially therewith, and the limiting element thereby ensures precise positioning of the guiding element relative to the brake carrier. The first elastomer section extends around the central axis and is arranged coaxially therewith, and the limiting element thereby ensures precise positioning of the guiding element relative to the brake carrier. The first metal section, the second metal section and the first elastomer section extend around the central axis and are arranged coaxially therewith, thereby further optimizing the positioning of the guiding element relative to the brake carrier. The first elastomer section comprises natural rubber, synthetic rubber, vulcanizates and/or rubber or is formed from one or more of these components. In one exemplary arrangement, if the first side of the first elastomer section faces the central axis of the guiding element, and the second side of the first elastomer section faces away from the central axis. Owing to the fact that the first elastomer section is elastically deformable, deformation of the first elastomer section, for example in the axial direction, is ensured. In addition, the fact that the first elastomer section is elastically deformable ensures that the first elastomer section can transition from an initial state, in which the first elastomer section is preferably not under mechanical load and not deformed, into at least one elastically deformed state, in which the first elastomer section is under mechanical load and elastically deformed, and back into the initial state. In the at least one elastically deformed state, a spring force, for example in the axial direction, can be provided by the first elastomer section. In addition, the fact that the first elastomer section is elastically deformable and is arranged between the guiding element and the section of the brake carrier ensures that vibration damping of the floating caliper brake is optimized.

For example, the first elastomer section can assume three essential functions. The first function can be referred to as a return function and consists in that, in the second position, by providing the spring force acting on the first metal section in the axial direction and towards the first section of the wall, the first elastomer section can bring the floating caliper brake from the second position into the first position or can at least assist it during this process, in particular when the brake pads are no longer being moved in the direction of the brake disc by the actuating device. Thus, the first elastomer section can release the brake pads from engagement with the brake disc and move the brake pads in such a way that they are arranged at a distance from the brake disc, or the first elastomer section can at least assist in this process. As a result, it is possible to dimension the return springs that are normally provided for this function in a weight-saving manner or, if appropriate, to dispense with certain return springs. The second function of the first elastomer section can be referred to as a coupling function and, in interaction with the predetermined non-positive engagement force threshold as already described above, in that the release clearance in the first position is less than or equal to a predetermined maximum value and greater than or equal to a predetermined minimum value. By predetermining the stiffness of the first elastomer section and the non-positive engagement force threshold, it is possible to predetermine the distance in the axial direction between the first metal section and the first section of the wall in the second position, even when the wear state changes, since the first metal section can move relative to the guiding element in the axial direction in accordance with the wear state.

The third function of the first elastomer section is that the fact that the first elastomer section is elastically deformable and is arranged between the guiding element and the section of the brake carrier ensures that vibration damping of the floating caliper brake is optimized.

The first metal section is fastened non-positively to the guiding element and is arranged in the recess in such a way that, in the first position, the first section of the first metal section rests in the axial direction, with positive engagement, against the first section of the wall, which defines the recess, on the first side of the limiting element. The non-positive fastening of the first metal section to the guiding element and the positive contact with the first section of the wall in the first position of the first section of the first metal section are significant advantages of this disclosure, which will be discussed in more detail below.

In the second position, in which the first metal section and the first section of the wall are arranged at a distance from one another in the axial direction, the first elastomer section is elastically deformed in such a way that a spring force acts on the first metal section in the axial direction and towards the first section of the wall, and when the spring force is equal to or greater than a predetermined non-positive engagement force threshold, the non-positive connection between the first metal section and the guiding element is cancelled, with the result that the first metal section moves relative to the guiding element in the axial direction, and when the spring force is less than the predetermined non-positive connection between the first metal section and the guiding element is re-established.

As already described, both a first position and a second position are provided. In the first position, the first section of the first metal section rests in positive engagement against the first section of the wall in the axial direction on the first side of the limiting element. In the second position, as already described, the first metal section and the first section of the wall are arranged at a distance from one another in the axial direction. In the first position, the first brake pad and the second brake pad are arranged at a distance from the corresponding surfaces of the brake disc and do not engage with them. The distance between a specific brake pad and the surface of the brake disc can also be referred to, for example in the first position, as the release clearance of this brake pad. In one exemplary arrangement, the release clearance of each brake pad in the first position is between 0.1 mm to 0.6 mm. In another exemplary arrangement, the release clearance is between 0.1 mm to 0.4 mm. In the second position, the first brake pad and the second brake pad rest against the corresponding surfaces of the brake disc and engage with them. In the second position, the guiding element together with the first metal section is preferably arranged offset along the axial direction relative to the second metal section and the section of the brake carrier in comparison with the first position, and the first elastomer section is elastically deformed. In the second position, the first metal section and the first section of the wall are spaced from one another in the axial direction by 0.1 mm to 0.6 mm. In one exemplary arrangement, the first metal section is spaced from the first section of the wall by 0.1 mm to 0.4 mm. The distance between the first metal section and the first section of the wall in the axial direction in the second position corresponds to the release clearance of one of the brake pads. By adjusting the distance between the first metal section and the first section of the wall in the axial direction in the second position, it is thus possible to adjust the release clearance of one of the brake pads.

The fact that, when the spring force is equal to or greater than the predetermined non-positive engagement force threshold, the non-positive connection between the first metal section and the guiding element is cancelled, with the result that the first metal section moves relative to the guiding element in the axial direction, ensures that, in the event of wear phenomena on the brake pads or the brake disc, the release clearance in the first position is less than or equal to a predetermined maximum value, thereby ensuring a delay-free braking process. The fact that, when the spring force is less than the predetermined non-positive engagement force threshold, the non-positive connection between the first metal section and the guiding element is re-established, ensures that the clearance in the first position is greater than or equal to a predetermined minimum value, thereby ensuring that, in the first position, the brake pads are at a sufficient distance from the corresponding surfaces of the brake disc.

In summary, it may therefore be stated that a floating caliper brake is provided in which, for example in the case of wear phenomena on the brake pads or the brake disc, a delay-free braking process is ensured, and, when no braking process is being carried out, sufficient distances between the brake pads and the corresponding surfaces of the brake disc are ensured.

In one exemplar arrangement, the first metal section is a section of a first metal sleeve, wherein the first metal sleeve and the guiding element are connected to one another non-positively by an interference fit. The use of a metal sleeve ensures that precise positioning of the guiding element with respect to the brake carrier can be achieved in a material-saving manner. The interference fit represents a technical connection which is simple to implement.

In one exemplary arrangement, the second metal section is a section of a second metal sleeve, wherein the second metal sleeve and the section of the brake carrier are connected to one another non-positively by an interference fit. The use of a metal sleeve ensures that precise positioning of the guiding element with respect to the brake carrier can be achieved in a material-saving manner. The interference fit represents a connection which can be implemented in a technically simple manner.

In one exemplary arrangement, the second metal section is connected directly, in particular non-positively, to the section of the brake carrier. A direct connection of the second metal section to the section of the brake carrier ensures precise positioning of the guiding element with respect to the brake carrier. A non-positive connection ensures that easily mounted add-on structures of the second metal section and of the section of the brake carrier can be used. The non-positive connection between the second metal section and the section of the brake carrier is designed in such a way that, when the limiting element is loaded in the axial direction, the non-positive connection between the first metal section and the guiding element can be cancelled, and in this case the non-positive connection between the second metal section and the section of the brake carrier remains established. This ensures that, although the first metal section can move relative to the guiding element in the axial direction, the second metal section and the brake carrier cannot move relative to one another.

In one exemplary arrangement, a section of the first elastomer section or a section of a second elastomer section is arranged between the second metal section and the section of the brake carrier, with the result that the second metal section and the section of the brake carrier are connected indirectly to one another. This configuration further optimizes vibration damping. The section of the first elastomer section or the section of the second elastomer section has a structured surface, which is structured in a lamellar or sawtoothed configuration, on a side of the first elastomer section or of the second elastomer section which faces the section of the brake carrier, on which the first elastomer section or the second elastomer section is in contact with the section of the brake carrier, for example rests against the latter. The structured surface, which is structured in a lamellar or sawtoothed configuration, ensures that the limiting element can be easily mounted and that it is held securely in the mounted state.

In one exemplary arrangement, the section of the first elastomer section or the section of the second elastomer section and the section of the brake carrier are connected to one another non-positively. The non-positive connection between the section of the first elastomer section and the section of the brake carrier is designed in such a way that, when the limiting element is loaded in the axial direction, the non-positive connection between the first metal section and the guiding element is cancelled, and the non-positive connection between the section of the first elastomer section and the section of the brake carrier remains established. This ensures that, although the first metal section can move relative to the guiding element in the axial direction, the first elastomer section and the brake carrier cannot move relative to one another. The section of the second elastomer section and the section of the brake carrier are connected to one another non-positively. The non-positive connection between the section of the second elastomer section and the section of the brake carrier is designed in such a way that, when the limiting element is loaded in the axial direction, the non-positive connection between the first metal section and the guiding element is cancelled, and the non-positive connection between the section of the second elastomer section and the section of the brake carrier remains established. This ensures that, although the first metal section can move relative to the guiding element in the axial direction, the second elastomer section and the brake carrier cannot move relative to one another.

In one exemplary arrangement, the floating caliper brake further comprises a bellows section, which is integrally formed with the first elastomer section or integrally formed with the second elastomer section. The bellows section protects a section of the guiding element from contamination and other environmental influences. The one-piece design simplifies installation and ensures efficient protection against contamination and other environmental influences.

In one exemplary arrangement, the bellows section extends from a first end, at which the bellows section is connected to the guiding element, along the axial direction towards a second end, at which the bellows section is formed integrally with the first elastomer section or integrally with the second elastomer section. The bellows section extends from a first end, at which the bellows section is connected to the guiding element, along the axial direction towards a second end, at which the bellows section is connected to the section of the brake carrier. In addition, the bellows section extends around the central axis.

In one exemplary arrangement, the first metal section and/or the second metal section have/has a recess extending in the axial direction. The recess of the first metal section ensures that the installation of the limiting element and the non-positive fastening of the first metal section to the guiding element is simplified. For example, the non-positive engagement force threshold can also be set by the specific design of the recess. The recess of the second metal section ensures that the installation of the limiting element and, for example, the connection of the second metal section to the section of the brake carrier is simplified.

In one exemplary arrangement, the second metal section has a structured surface, for example grooves extending perpendicularly to the axial direction or webs extending perpendicularly to the axial direction. The structured surface ensures optimization of the non-positive connection between the second metal section and the section of the brake carrier. The structured surface may have grooves which extend perpendicularly to the axial direction or webs which extend perpendicularly to the axial direction. Grooves which extend perpendicularly to the axial direction or webs which extend perpendicularly to the axial direction provide a particularly simple structured surface.

In one exemplary arrangement, the non-positive engagement force threshold is at least 40 N. In one exemplary arrangement, the non-positive engagement force threshold is at least 50 N. In yet a further exemplary arrangement, the non-positive engagement force threshold is—at least 60 N. With an increasing non-positive engagement force threshold, the first metal section moves relative to the guiding element in the axial direction only when there are relatively major wear phenomena, or the risk of movement taking place without there being any wear to compensate is reduced.

In one exemplary arrangement, in the second position, the first metal section and the first section of the wall are spaced from one another in the axial direction by 0.1 mm to 0.6 mm. In one exemplary arrangement, the spacing is between 0.1 mm to 0.4 mm. The distance between the first metal section and the first section of the wall in the axial direction in the second position corresponds to the release clearance of one of the brake pads. By adjusting the distance between the first metal section and the first section of the wall in the axial direction in the second position, it is thus possible to adjust the release clearance of one of the brake pads.

In addition to the section already described, the floating caliper brake preferably has a further section of substantially identical construction, which, when viewed perpendicularly to the axial direction, is arranged on an opposite side of the axis of rotation of the brake disc and for which the features and advantages described in connection with the section already described apply at least analogously. In addition to the section already described, the floating caliper brake thus has the further section of substantially identical construction, which is arranged offset along a plane along which a mounted brake disc extends.

The floating caliper brake has two sections of the brake carrier, two guiding elements, two bore sections, two limiting elements and two bellows sections, each of which is of substantially identical construction and wherein at least the two guiding elements and the two bore sections each extend parallel to one another and to the axial direction. It is thus possible, in two mutually spaced sections of the brake carrier, for forces to be transmitted perpendicularly to the axial direction between the respective guiding elements and the respective sections of the brake carrier, and at the same time a relative movement in the axial direction between the respective guiding elements and the respective sections of the brake carrier can be ensured. Via the respective fastening regions of the corresponding guiding elements, forces which are caused by the weight of the brake caliper, by the weight of an actuating device, vibrations, deformation forces or else by a braking process can be transmitted in two mutually spaced sections from the brake caliper to the corresponding guiding element and from the latter, via contact between the corresponding section of the guiding element and a corresponding inner surface of the bore section, to the brake carrier, for example, perpendicularly to the axial direction, and from there to the component of the vehicle. When viewed perpendicularly to the axial direction, a respective clearance between the guiding element and the wall of the bore section is provided on two opposite sides of the axis of rotation, thus making it possible to compensate for manufacturing tolerances and to optimize damping, resetting and wear adjustment with the aid of a limiting element on each side.

In an alternative exemplary arrangement, the floating caliper brake has two sections of the brake carrier, two guiding elements, two bore sections, and two bellows sections and only one limiting element. When viewed perpendicularly to the axial direction, the floating caliper brake thus has a limiting element on a first side of the axis of rotation of the brake disc and no limiting element on a second side, opposite the first side, of the axis of rotation of the brake disc. On the second side of the axis of rotation, clearance-free guidance is provided, which is ensured in that, on the second side, the guiding element has no clearance in the bore section or is arranged without clearance in the bore section, when viewed perpendicularly to the axial direction. On the first side of the axis of rotation, on the other hand, a clearance is provided between the guiding element and the wall of the bore section, thus making it possible to compensate for manufacturing tolerances and to optimize damping, resetting and wear adjustment with the aid of the limiting element.

BRIEF DESCRIPTION OF DRAWINGS

Further features, advantages and possible uses of the present disclosure will be found in the following description of the exemplary arrangements and the figures. In this context, all the features described and/or graphically depicted form the subject matter of the disclosure individually and in any combination, even independently of their combination in the individual claims or their dependency references. In the figures, the same reference signs furthermore stand for the same or similar objects.

DETAILED DESCRIPTION

Figure 1:
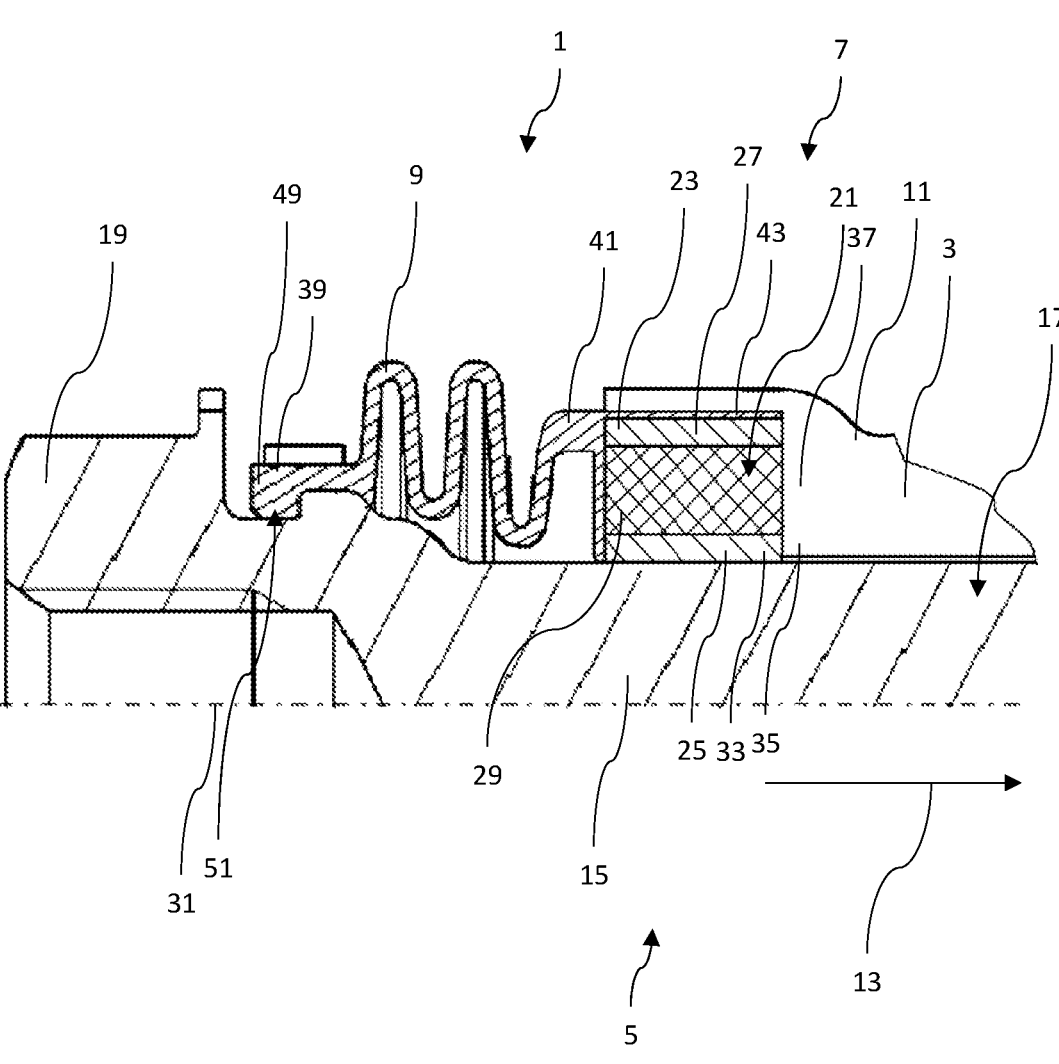
FIG. 1 shows a schematic illustration of a first exemplary arrangement of a floating caliper brake according to the disclosure.
Figure 2:
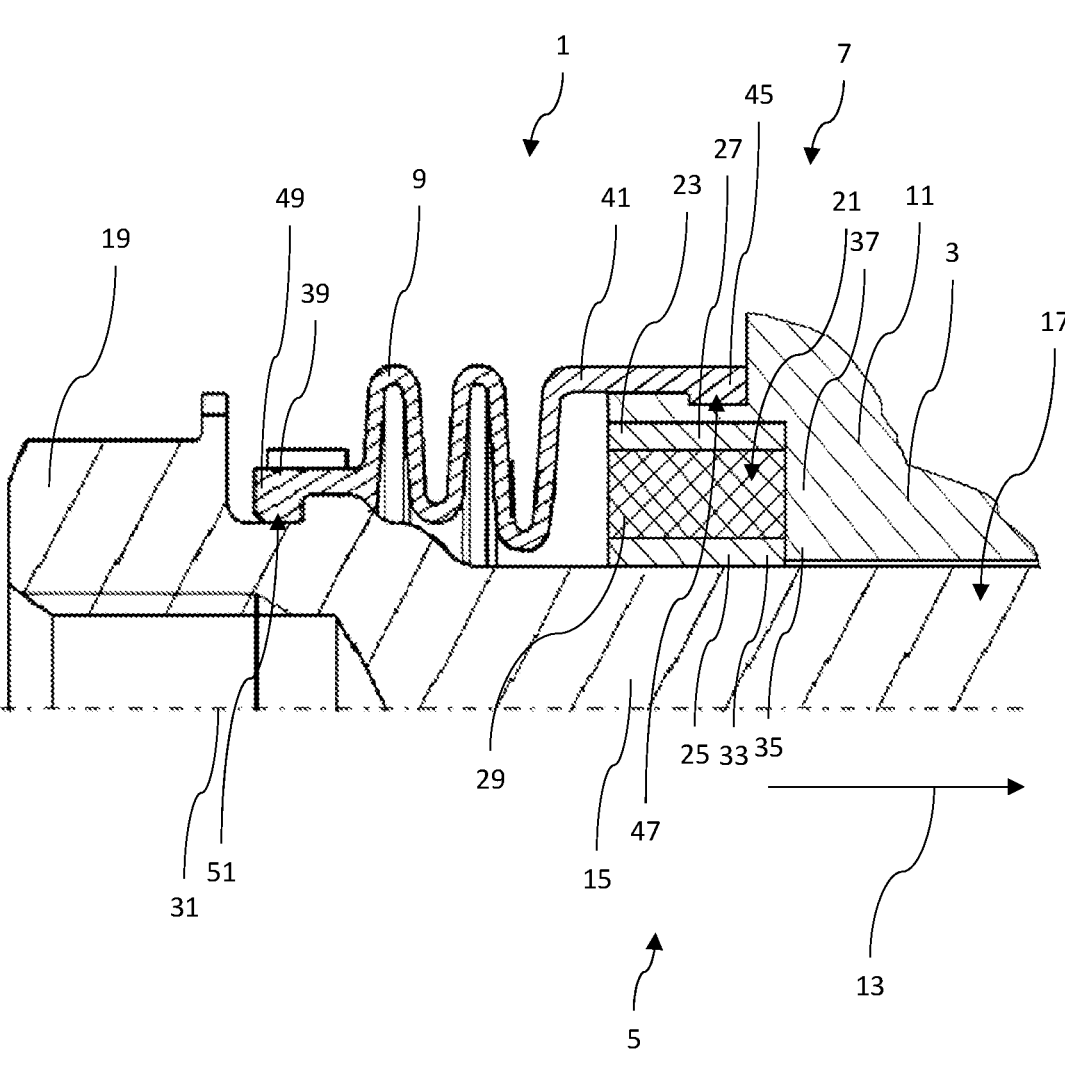
FIG. 2 shows a schematic illustration of a second exemplary arrangement of the floating caliper brake according to the disclosure.

FIG. 1 shows a schematic view of a first exemplary arrangement of a floating caliper brake 1 according to the disclosure and FIG. 2 shows a schematic view of a second exemplary arrangement of the floating caliper brake 1 according to the disclosure. FIGS. 1 and 2 each show a section of the first or second exemplary arrangement of the floating caliper brake 1. The floating caliper brake 1 has a brake carrier 3, a brake caliper (not shown in FIGS. 1 and 2), a guiding device 5, a limiting device 7 and a bellows section 9. Each of the exemplary arrangements of the floating caliper brake 1 according to the disclosure which are shown here is a fist-type caliper brake. A fist-type caliper brake has the advantage that the brake caliper can be dimensioned in a material-saving manner. For example, in contrast to a floating frame brake, the fist-type caliper brake has the advantage that no floating frame and no floating frame guide have to be provided.

The brake carrier 3 has a fastening arrangement for fastening the brake carrier 3 to a component, such as a wheel carrier, of a vehicle. The fastening arrangement of the brake carrier 3 ensures that forces which are caused by a braking process can be transmitted from the brake carrier 3 to the component of the vehicle. The brake carrier 3 has a section 11. The brake caliper has a fastening arrangement for fastening an actuating device to the brake caliper. The actuating device will be described in more detail later. The brake caliper has a section which will be discussed in more detail later.

The guiding device 5 is designed to guide the brake caliper relative to the brake carrier 3 in an axial direction 13. For this purpose, the guiding device 5 has a guiding element 15 and a bore section 17. In connection with the present disclosure, the axial direction 13 relates to an assembled state, in which the brake carrier 3, the brake caliper, the guiding device 5 and a brake disc are assembled. In this assembled state, the axial direction 13 extends parallel to the axis of rotation of the brake disc.

The guiding element 15 extends from a fastening region 19, by which the guiding element 15 is fastened to the already mentioned section of the brake caliper, towards a free end. The fastening region 19 is connected to the section of the brake caliper in such a way that a movement of the fastening region 19 and of the section of the brake caliper in the axial direction 13 with respect to one another is prevented. This ensures that a translation of the guiding element 15 in the axial direction 13 relative to the brake caliper is prevented.

The bore section 17 extends in the axial direction 13 in the section 11 of the brake carrier 3. The fact that the bore section 17 extends in the axial direction 13 in the section 11 of the brake carrier 3 ensures that the bore section 17 can be used to guide the brake caliper relative to the brake carrier 3 in the axial direction 13. A section of the guiding element 15 which is arranged between the fastening region 19 and the free end is arranged in the bore section 17. In one exemplary arrangement, the section of the guiding element 15 which is arranged between the fastening region 19 and the free end is arranged in the bore section 17 in such a way that forces can be transmitted between the guiding element 15 and the section 11 of the brake carrier 3 perpendicularly to the axial direction 13 and, at the same time, a relative movement between the guiding element 15 and the section 11 of the brake carrier 3 in the axial direction 13 is ensured. Via the fastening region 19 of the guiding element 15, forces which are caused by the weight of the brake caliper, by the weight of an actuating device, vibrations, deformation forces or else by a braking process can be transmitted from the brake caliper to the guiding element 15 and from the latter, via contact between that section of the guiding element 15 which is arranged between the fastening region 19 and the free end and an inner surface of the bore section 17, to the brake carrier 3, for example, perpendicularly to the axial direction 13, and from there to the component of the vehicle. For fastening to the brake caliper, the fastening region 19 of the guiding element 15 may be an internal thread, which extends along the central axis 31 of the guiding element 15 and into which an external thread of a screw engages. The combination of an internal thread and a screw with an external thread provides a simple and reliable detachable connection between the fastening region 19 of the guiding element 15 and the brake caliper.

The limiting device 7 is designed to limit the movement of the brake caliper relative to the brake carrier 3 in the axial direction 13. For this purpose, the limiting device 7 has a recess 21 and a limiting element 23. The recess 21 is arranged in the section 11 of the brake carrier 3 and is connected to the bore section 17 perpendicularly to the axial direction 13.

The limiting element 23 has a first metal section 25, a second metal section 27 and a first elastomer section 29. The first metal section 25 is a section of a first metal sleeve. The first metal sleeve extends in the axial direction 13 and around a central axis 31 of the guiding element 15. The use of a metal sleeve designed in this way ensures that precise positioning of the guiding element 15 with respect to the brake carrier 3 can be achieved in a material-saving manner. The first metal section 25 has a recess which extends in the axial direction 13 and is not shown in FIGS. 1 and 2. The recess of the first metal section 25 ensures that the installation of the limiting element 23 and the non-positive fastening of the first metal section 25 to the guiding element 15 is simplified. For example, the non-positive engagement force threshold can also be set by the specific design of the recess.

The second metal section 27 is a section of a second metal sleeve. The second metal sleeve extends in the axial direction 13 and around the central axis 31 of the guiding element 15. The use of a metal sleeve designed in this way ensures that precise positioning of the guiding element 15 with respect to the brake carrier 3 can be achieved in a material-saving manner. The second metal section 27 has a recess which extends in the axial direction 13 and is not shown in FIGS. 1 and 2. The recess of the second metal section 27 ensures that the installation of the limiting element 23 and, for example, the connection of the second metal section 27 to the section 11 of the brake carrier 3 is simplified. The second metal section 27 has a structured surface which is directed radially outwards relative to the central axis 31. The structured surface ensures optimization of the non-positive connection between the second metal section 27 and the section 11 of the brake carrier 3. The structured surface has grooves which extend perpendicularly to the axial direction 13 or webs which extend perpendicularly to the axial direction 13. Grooves which extend perpendicularly to the axial direction 13 or webs which extend perpendicularly to the axial direction 13 provide a particularly simple structured surface.

The first elastomer section 29 is elastically deformable. Owing to the fact that the first elastomer section 29 is elastically deformable, deformation of the first elastomer section 29, for example in the axial direction 13, is ensured. In addition, the fact that the first elastomer section 29 is elastically deformable ensures that the first elastomer section 29 can transition from an initial state, in which the first elastomer section 29 is not under mechanical load and preferably not deformed, into at least one elastically deformed state, in which the first elastomer section 29 is under mechanical load and elastically deformed, and back into the initial state. In the at least one elastically deformed state, a spring force, which may be in the axial direction 13, can be provided by the first elastomer section 29. In addition, the fact that the first elastomer section 29 is elastically deformable and is arranged between the guiding element 15 and the section 11 of the brake carrier 3 ensures that vibration damping of the floating caliper brake 1 is optimized.

The first metal section 25 is connected to the first elastomer section 29 on a first side of the first metal section 25 and on a first side of the first elastomer section 29, which faces the central axis 31. The first metal section 25 is non-positively fastened to the guiding element 15 on a side of the first metal section 25 which is situated opposite the first side of the first metal section 25. As already described, the first metal section 25 is a section of a first metal sleeve. The first metal sleeve and the guiding element 15 are connected to one another non-positively by an interference fit.

In addition, the first metal section 25 is arranged in such a way in the recess 21 that, in a first position, a first section 33 of the first metal section 25 rests in the axial direction 13, with positive engagement, against a first section 35 of a wall 37, which defines the recess 21, on a first side of the limiting element 23, which faces away from the fastening region 19 in the axial direction 13. The first position is shown in FIGS. 1 and 2. In a second position (not shown), the first metal section 25 and the first section 35 of the wall 37 are arranged at a distance from one another in the axial direction 13.

The second metal section 27 is connected to the first elastomer section 29 on a first side of the second metal section 27 and on a second side of the first elastomer section 29, which is situated opposite the first side of the first elastomer section 29 and faces away from the central axis 31. The second metal section 27 is connected to the section 11 of the brake carrier 3 on a second side of the second metal section 27, which is situated opposite the first side of the second metal section 27.

As already described, the floating caliper brake 1 has the bellows section 9. The bellows section 9 extends from a first end 39, at which the bellows section 9 is connected to the guiding element 15, along the axial direction 13 towards a second end 41, at which the bellows section 9 is connected to the section 11 of the brake carrier 3. In addition, the bellows section 9 extends around the central axis 31. The bellows section 9 protects a section of the guiding element 15 from contamination and, where applicable, other environmental influences.

The first exemplary arrangement of the floating caliper brake 1, which is shown in FIG. 1, and the second exemplary arrangement of the floating caliper brake 1, which is shown in FIG. 2, are of substantially identical construction, wherein the two arrangements differ from one another in the design of the limiting element 23 and the design of the bellows section 9, as described below.

FIG. 1 shows that a section of a second elastomer section 43 is arranged between the second metal section 27 and the section 11 of the brake carrier 3, with the result that the second metal section 27 and the section 11 of the brake carrier 3 are connected indirectly to one another. The section of the second elastomer section 43 and the section 11 of the brake carrier 3 are connected to one another non-positively. The non-positive connection between the section of the second elastomer section 43 and the section 11 of the brake carrier 3 is designed in such a way that, when the limiting element 23 is loaded in the axial direction 13, the non-positive connection between the first metal section 25 and the guiding element 15 is cancelled, and the non-positive connection between the section of the second elastomer section 43 and the section 11 of the brake carrier 3 remains established. This ensures that, although the first metal section 25 can move relative to the guiding element 15 in the axial direction 13, the second elastomer section 43 and the brake carrier 3 cannot move relative to one another.

In FIG. 1, the bellows section 9 is formed integrally with the second elastomer section 43 at the second end 41. The second end 41 is connected indirectly to the section 11 of the brake carrier 3 via the second elastomer section 43. In an alternative exemplary arrangement (not shown) of the floating caliper brake 1, a section of the first elastomer section 29 can be arranged between the second metal section 27 and the section 11 of the brake carrier 3, with the result that the second metal section 27 and the section 11 of the brake carrier 3 are connected indirectly to one another. In this alternative exemplary arrangement (not shown), the section of the first elastomer section 29 and the section 11 of the brake carrier 3 can be connected to one another non-positively. Furthermore, in this alternative exemplary arrangement (not shown), the bellows section 9 can be formed integrally with the first elastomer section 29 at the second end 41. In this case, the second end 41 can be connected indirectly to the section 11 of the brake carrier 3 via the first elastomer section 29.

FIG. 2 shows that the second metal section 27 is connected directly and non-positively to the section 11 of the brake carrier 3. The non-positive connection between the second metal section 27 and the section 11 of the brake carrier 3 is designed in such a way that, when the limiting element 23 is loaded in the axial direction 13, the non-positive connection between the first metal section 25 and the guiding element 15 can be cancelled, and in this case the non-positive connection between the second metal section 27 and the section 11 of the brake carrier 3 remains established. This ensures that, although the first metal section 25 can move relative to the guiding element 15 in the axial direction 13, the second metal section 27 and the brake carrier 3 cannot move relative to one another. As already described, the second metal section 27 is a section of a second metal sleeve. The second metal sleeve and the section 11 of the brake carrier 3 are connected to one another non-positively by an interference fit. The second end 41 is connected positively and directly to the section 11 of the brake carrier 3. For this purpose, the second end 41 has a flange section 45, which runs around the central axis 31 and points radially inwards towards the central axis 31, and which engages in a groove 47, which runs around the central axis 31 and is open radially outwards relative to the central axis 31, in the section 11 of the brake carrier 3. Such a design with a flange section and a groove provides a particularly simple construction.

Both in FIG. 1 and in FIG. 2, the first end 39 of the bellows section 9 has a flange section 49, which runs around the central axis 31 and points radially inwards towards the central axis 31, and which engages in a groove 51, which runs around the central axis 31 and is open radially outwards relative to the central axis 31, in the fastening region 19 of the guiding element 15. Such a design with a flange section and a groove provides a simple construction.

As already described, the brake caliper has a fastening arrangement for fastening an actuating device to the brake caliper. In the mounted state, the actuating device is fastened to the brake caliper. The actuating device has an electromechanical drive unit, which has a first section, which is connected to the fastening the brake caliper, and has a second section, which is mounted so as to be movable with respect to the first section. In an alternative exemplary arrangement, the actuating device has a hydraulic drive unit, which has the first section, which is connected to the fastening arrangement of the brake caliper, and has the second section, which is mounted so as to be movable with respect to the first section. Furthermore, the drive unit is designed to drive a relative movement between the first section and the second section. The brake caliper is connected to a first brake pad, which is arranged on a first side of a plane along which a brake disc extends in the mounted state, and the second section of the drive unit is connected to a second brake pad arranged on a second side of the plane, opposite the first side, such that, in the mounted state of the brake disc, by moving the first section and the second section relative to one another in the axial direction 13, the first brake pad can be moved from the first side of the plane in the direction of a first side of the brake disc and can be brought into contact with the brake disc from this side, and the second brake pad can be moved from the second side of the plane in the direction of a second side of the brake disc and can be brought into contact with the brake disc from this side. The actuating device is thus configured to move the first brake pad in the direction of and against a surface on the first side of the brake disc and to move the second brake pad in the direction of and against a surface on the second side of the brake disc. Owing to the fact that the actuating device is fastened to the brake caliper, and the guiding device 5 is designed to guide the brake caliper relative to the brake carrier 3 in the axial direction 13, the actuating device together with the brake caliper is also guided relative to the brake carrier 3 in the axial direction 13 with the aid of the guiding device 5. As a result, the actuating device and thus also the first brake pad and the second brake pad can be optimally positioned in the axial direction 13 relative to the brake disc as the two brake pads are moved against the surfaces of the brake disc. For example, a relative movement then takes place between the brake carrier 3 and the brake caliper when the first brake pad and the second brake pad are moved towards the brake disc or away from the brake disc along the axial direction 13. When the brake disc rotates about its axis of rotation and the first brake pad or the second brake pad engages with a corresponding surface of the brake disc, braking forces act between the brake disc and the first and/or second brake pad, for example, perpendicularly to the axis of rotation, i.e. also perpendicularly to the axial direction 13. For the braking forces acting perpendicularly to the axial direction 13, or at least a large part of these braking forces, are usually transmitted directly to the brake carrier 3 via carrier plates, to which the brake pads are fastened, via contact surfaces, at which the carrier plates rest against the brake carrier 3. In the brake caliper, in turn, forces act primarily in the axial direction 13. The weight of the brake caliper, the weight of an actuating device, vibrations which are caused, for example, by the braking process, deformation forces or even a small proportion of the forces caused by the braking process which act perpendicularly to the axial direction 13 can be transmitted via the brake caliper to the guiding element 15 and from the latter to the brake carrier 3 and onwards to the wheel carrier of the vehicle.

As already described, both in the first exemplary arrangement and in the second exemplary arrangement, both a first position shown in FIGS. 1 and 2 and a second position not shown in FIGS. 1 and 2 are provided. In the first position, the first section of the first metal section 25 rests in positive engagement against the first section 35 of the wall 37 in the axial direction 13 on the first side of the limiting element 23. In the second position, as already described, the first metal section 25 and the first section 35 of the wall 37 are arranged at a distance from one another in the axial direction 13.

In the first position, the first brake pad and the second brake pad are arranged at a distance from the corresponding surfaces of the brake disc and do not engage with them. The distance between a specific brake pad and the surface of the brake disc can also be referred to, for example in the first position, as the release clearance of this brake pad. The release clearance of each brake pad in the first position is 0.1 mm to 0.6 mm. In one exemplary arrangement, the release clearance of each brake pad is 0.1 mm to 0.4 mm. In the second position, the first brake pad and the second brake pad rest against the corresponding surfaces of the brake disc and engage with them. In the second position, the guiding element 15 together with the first metal section 25 is arranged offset along the axial direction 13 relative to the second metal section 27 and the section 11 of the brake carrier 3 in comparison with the first position, and the first elastomer section 29 is elastically deformed. In the second position, the first metal section 25 and the first section 35 of the wall 37 are spaced from one another in the axial direction 13 by 0.1 mm to 0.6 mm. In one exemplary arrangement, the spacing is 0.1 mm to 0.4 mm. The distance between the first metal section 25 and the first section 35 of the wall 37 in the axial direction 13 in the second position corresponds to the release clearance of one of the brake pads. By adjusting the distance between the first metal section 25 and the first section 35 of the wall 37 in the axial direction 13 in the second position, it is thus possible to adjust the release clearance of one of the brake pads.

In general, it is desirable in the case of floating caliper brakes to provide a constant release clearance, such that, in particular also in the event of wear phenomena on the brake pads or the brake disc, the release clearance in the first position is less than or equal to a predetermined maximum value, such as, for example, 0.6 mm or 0.5 mm, and does not exceed this maximum value, in order to ensure a delay-free braking process. At the same time, it is desirable for the release clearance in the first position to be greater than or equal to a predetermined minimum value, such as, for example, 0.1 mm or 0.2 mm, and not to fall below this minimum value, in order to ensure that, in the first position, the brake pads are arranged at a distance from the corresponding surfaces of the brake disc and do not engage with them.

One significant advantage of the first exemplary arrangement and of the second exemplary arrangement of the floating caliper brake 1 is that, in the second position, the first elastomer section 29 is elastically deformed in such a way that a spring force acts on the first metal section 25 in the axial direction 13 and towards the first section 35 of the wall 37, and that, when the spring force is equal to or greater than a predetermined non-positive engagement force threshold, the non-positive connection between the first metal section 25 and the guiding element 15 is cancelled, with the result that the first metal section 25 moves relative to the guiding element 15 in the axial direction 13, and that, when the spring force is less than the predetermined non-positive engagement force threshold, the non-positive connection between the first metal section 25 and the guiding element 15 is re-established. The fact that, when the spring force is equal to or greater than the predetermined non-positive engagement force threshold, the non-positive connection between the first metal section 25 and the guiding element 15 is cancelled, with the result that the first metal section 25 moves relative to the guiding element 15 in the axial direction 13, ensures that, particularly in the event of wear phenomena on the brake pads or the brake disc, the release clearance in the first position is less than or equal to a predetermined maximum value. The fact that, when the spring force is less than the predetermined non-positive engagement force threshold, the non-positive connection between the first metal section 25 and the guiding element 15 is re-established, ensures that the clearance in the first position is greater than or equal to a predetermined minimum value.

In one exemplary arrangement, the first elastomer section 29 assumes three essential functions. The first function can be referred to as a return function and includes, in the second position, by providing the spring force acting on the first metal section 25 in the axial direction 13 and towards the first section 35 of the wall 37, the first elastomer section 29 can bring the floating caliper brake 1 from the second position into the first position or can at least assist it during this process, in particular when the brake pads are no longer being moved in the direction of the brake disc by the actuating device. Thus, the first elastomer section 29 can release the brake pads from engagement with the brake disc and move the brake pads in such a way that they are arranged at a distance from the brake disc, or the first elastomer section 29 can at least assist in this process. As a result, it is possible to dimension the return springs that are normally provided for this function in a weight-saving manner or, if appropriate, to dispense with certain return springs.

The second function of the first elastomer section 29 can be referred to as a coupling function and, in interaction with the predetermined non-positive engagement force threshold as already described above, includes the release clearance in the first position is less than or equal to a predetermined maximum value and greater than or equal to a predetermined minimum value. By predetermining the stiffness of the first elastomer section 29 and the non-positive engagement force threshold, it is possible to predetermine the distance in the axial direction 13 between the first metal section 25 and the first section 35 of the wall 37 in the second position, even when the wear state changes, since the first metal section 25 moves relative to the guiding element 15 in the axial direction 13 in accordance with the wear state. The non-positive engagement force threshold is at least 40 N. In one exemplary arrangement, the non-positive engagement force threshold is at least 50 N. In still a further exemplary arrangement, the non-positive engagement force threshold is at least 60 N. With an increasing non-positive engagement force threshold, the first metal section 25 moves relative to the guiding element 15 in the axial direction 13 only when there are major wear phenomena.

The third function of the first elastomer section 29 is that the fact that the first elastomer section 29 is elastically deformable and is arranged between the guiding element 15 and the section 11 of the brake carrier 3 ensures that vibration damping of the floating caliper brake 1 is optimized.

Moreover, the first metal section 25, the second metal section 27 and the first elastomer section 29 each extend around the central axis 31 and are arranged coaxially therewith, as a result of which the limiting element 23 ensures precise positioning of the guiding element 15 relative to the brake carrier 3.

It should also be mentioned that the floating caliper brake 1 has, in addition to the sections shown in FIGS. 1 and 2, in each case a section of substantially identical construction which, when viewed perpendicularly to the axial direction 13, is arranged offset with respect to the sections shown in FIGS. 1 and 2 and for which the features and advantages described in connection with the sections shown in FIGS. 1 and 2 apply at least analogously. In addition to the corresponding sections shown in FIGS. 1 and 2, the floating caliper brakes 1 thus preferably have a further section of substantially identical construction, which is arranged offset along a plane along which a mounted brake disc extends.

The floating caliper brakes 1 shown in FIGS. 1 and 2 thus have two sections 11 of the brake carrier 3, two guiding elements 15, two bore sections 17, two limiting elements 23 and two bellows sections 41, each of which is of substantially identical construction and at least the two guiding elements 15 and the two bore sections 17 each extend parallel to one another and to the axial direction 13. It is thus possible, in two mutually spaced sections 11 of the brake carrier, for forces to be transmitted perpendicularly to the axial direction 13 between the respective guiding elements 15 and the respective sections 11 of the brake carrier 3, and at the same time a relative movement in the axial direction 13 between the respective guiding elements 15 and the respective sections 11 of the brake carrier 3 can be ensured. Via the respective fastening regions 19 of the corresponding guiding elements 15, forces which are caused by the weight of the brake caliper, by the weight of an actuating device, vibrations, deformation forces or else by a braking process can be transmitted in two mutually spaced sections from the brake caliper to the corresponding guiding element 15 and from the latter, via contact between the corresponding section of the guiding element 15 and a corresponding inner surface of the bore section 17, to the brake carrier 3, for example to the axial direction 13, and from there to the component of the vehicle. When viewed perpendicularly to the axial direction 13, a respective clearance between the guiding element 15 and the wall of the bore section 17 is preferably provided here on two opposite sides of the axis of rotation, as shown in FIGS. 1 and 2, thus making it possible to compensate for manufacturing tolerances and to optimize damping, resetting and wear adjustment with the aid of the limiting element 23.

In an alternative exemplary arrangement, the floating caliper brake 1 has two sections 11 of the brake carrier 3, two guiding elements 15, two bore sections 17, and two bellows sections 41 and only one limiting element 23. When viewed perpendicularly to the axial direction 13, the floating caliper brake 1 thus has a limiting element 23 on a first side of the axis of rotation of the brake disc, as shown in FIG. 1 or in FIG. 2 for example, and no limiting element 23 on a second side, opposite the first side, of the axis of rotation of the brake disc. On the second side of the axis of rotation, clearance-free guidance is, for example, provided, which is ensured in that, on the second side, the guiding element 15 has no clearance in the bore section 17, when viewed perpendicularly to the axial direction 13. On the first side of the axis of rotation, on the other hand, as shown in FIGS. 1 and 2, a clearance is provided between the guiding element 15 and the wall of the bore section 17, thus making it possible to compensate for manufacturing tolerances and to optimize damping, resetting and wear adjustment with the aid of the limiting element 23.

In addition, it should be noted that "having" does not exclude other elements or steps and "a" or "an" does not exclude a multiplicity. Attention is furthermore drawn to the fact that features which have been described with reference to one of the above exemplary arrangements can also be used in combination with other features of other exemplary arrangements described above. Reference signs in the claims are not to be regarded as a restriction.

The invention claimed is:

1. A floating caliper brake (1), comprising:
a brake carrier, which has a fastening arrangement for fastening the brake carrier to a component of a vehicle,
a brake caliper, which has a fastening arrangement for fastening an actuating device to the brake caliper,
a guiding device, which is designed to guide the brake caliper relative to the brake carrier in an axial direction, and having a guiding element, which extends from a fastening region, by which the guiding element is fastened to a section of the brake caliper, towards a free end, and a bore section, which extends in the axial direction, in a section of the brake carrier, wherein a section of the guiding element is arranged in the bore section, and
a limiting device, which is designed to limit the movement of the brake caliper relative to the brake carrier in the axial direction, and which has a recess, connected to the bore section perpendicularly to the axial direction, in the section of the brake carrier, and a limiting element,
wherein the limiting element has a first metal section, a second metal section, which is connected to the section of the brake carrier, and an elastically deformable first elastomer section, which is connected to the first metal section on a first side of the first elastomer section and is connected to the second metal section on a second side of the first elastomer section situated opposite the first side,
wherein the first metal section is fastened non-positively to the guiding element and is arranged in the recess in such a way that, in a first position, a first section of the first metal section rests in the axial direction, with positive engagement, against a first section of a wall, which defines the recess, on a first side of the limiting element,
wherein, in a second position, in which the first metal section and the first section of the wall are arranged at a distance from one another in the axial direction, the first elastomer section is deformed elastically in such a way that a spring force acts on the first metal section in the axial direction and towards the first section of the wall, and wherein, when the spring force is equal to or greater than a predetermined non-positive engagement force threshold, the non-positive connection between the first metal section and the guiding element is cancelled, with the result that the first metal section moves relative to the guiding element in the axial direction, and when the spring force is less than the predetermined non-positive engagement force threshold, the non-positive connection between the first metal section and the guiding element is re-established.

2. The floating caliper brake according to claim 1, wherein the first metal section is a section of a first metal sleeve, wherein the first metal sleeve and the guiding element are connected to one another non-positively by an interference fit.

3. The floating caliper brake according to claim 1, wherein the second metal section is a section of a second metal sleeve, wherein the second metal sleeve and the section of the brake carrier are connected to one another non-positively by an interference fit.

4. The floating caliper brake according to claim 1, wherein the second metal section is connected directly, to the section of the brake carrier.

5. The floating caliper brake according to claim 1, wherein a section of the first elastomer section or a section of a second elastomer section is arranged between the second metal section and the section of the brake carrier, such that the second metal section and the section of the brake carrier are connected indirectly to one another.

6. The floating caliper brake according to claim 5, wherein the section of the first elastomer section or the section of the second elastomer section and the section of the brake carrier are connected to one another non-positively.

7. The floating caliper brake according to claim 1, further comprising a bellows section, which is integrally formed with the first elastomer section or integrally formed with the second elastomer section.

8. The floating caliper brake according to claim 7, wherein the bellows section extends from a first end, at which the bellows section is connected to the guiding element, along the axial direction towards a second end, at which the bellows section is formed integrally with the first elastomer section or integrally with the second elastomer section.

9. The floating caliper brake according to claim 1, wherein the first metal section and/or the second metal section have/has a recess extending in the axial direction.

10. The floating caliper brake according to claim 1, wherein the second metal section has a structured surface.

11. The floating caliper brake according to claim 10, wherein the structured surface comprises grooves extending perpendicularly to the axial direction.

12. The floating caliper brake according to claim 10, wherein the structured surface comprises webs extending perpendicularly to the axial direction.

13. The floating caliper brake according to claim 1, wherein the non-positive engagement force threshold is at least 40 N.

14. The floating caliper brake according to claim 1, wherein, in the second position, the first metal section and the first section of the wall are spaced apart from one another in the axial direction by 0.1 mm to 0.6 mm.

* * * * *